(12) United States Patent
Pandey et al.

(10) Patent No.: US 10,958,872 B2
(45) Date of Patent: *Mar. 23, 2021

(54) VIDEO CALL CONTINUITY BETWEEN DEVICES VIA A TELECOMMUNICATIONS NETWORK

(71) Applicant: T-Mobile USA, Inc., Bellevue, WA (US)

(72) Inventors: Sudhanshu Pandey, Sammamish, WA (US); Praveen Magham, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,579

(22) Filed: May 29, 2020

(65) Prior Publication Data

US 2020/0296330 A1    Sep. 17, 2020

Related U.S. Application Data

(63) Continuation of application No. 15/632,167, filed on Jun. 23, 2017, now Pat. No. 10,701,310.

(51) Int. Cl.
| | |
|---|---|
| *H04N 7/14* | (2006.01) |
| *H04N 7/15* | (2006.01) |
| *B64C 39/02* | (2006.01) |
| *H04L 29/06* | (2006.01) |

(Continued)

(52) U.S. Cl.
CPC .......... *H04N 7/147* (2013.01); *B64C 39/024* (2013.01); *H04L 65/1016* (2013.01); *H04L 65/1069* (2013.01); *H04L 65/1073* (2013.01); *H04L 65/403* (2013.01); *H04L 65/601* (2013.01); *H04L 67/24* (2013.01); *H04N 7/148* (2013.01);

(Continued)

(58) Field of Classification Search
None
See application file for complete search history.

(56) References Cited

U.S. PATENT DOCUMENTS

| | | | |
|---|---|---|---|
| 7,711,002 | B2 | 5/2010 | Mukherjee et al. |
| 9,398,261 | B1 | 7/2016 | Pfeffer et al. |
| 9,515,969 | B1 | 12/2016 | Eidelson et al. |

(Continued)

FOREIGN PATENT DOCUMENTS

| | | |
|---|---|---|
| CN | 101584167 A | 11/2009 |
| CN | 101778244 A | 7/2010 |

(Continued)

OTHER PUBLICATIONS

European Patent Office, Extended European Search Report, EP Patent Application 17763746.9, dated Oct. 21, 2019, 8 pages.

(Continued)

*Primary Examiner* — Quoc D Tran
(74) *Attorney, Agent, or Firm* — Perkins Coie LLP

(57) ABSTRACT

Systems and methods are described herein for maintaining and/or facilitating video call continuity between devices. For example, the systems and methods support video calls or other communications between multiple devices (e.g., a mobile device providing a video call stream of content and a drone or other moving device capturing and streaming content via a camera) providing video content to a target device, such as another mobile device.

20 Claims, 6 Drawing Sheets

(51) Int. Cl.
*H04L 29/08* (2006.01)
*H04W 4/16* (2009.01)

(52) U.S. Cl.
CPC ............... *H04N 7/15* (2013.01); *H04W 4/16* (2013.01); *H04N 2007/145* (2013.01)

(56) References Cited

U.S. PATENT DOCUMENTS

| | | | |
|---|---|---|---|
| 9,723,121 | B2 | 8/2017 | Lam et al. |
| 9,854,010 | B2 | 12/2017 | Raghavan et al. |
| 9,911,398 | B1 | 3/2018 | Mcqueen et al. |
| 10,356,745 | B2 | 7/2019 | Karimli et al. |
| 10,630,835 | B2 | 4/2020 | Karimli et al. |
| 10,701,310 | B2 * | 6/2020 | Pandey ............... H04W 4/16 |
| 2003/0088676 | A1 * | 5/2003 | Smith ............... H04L 63/0414 709/227 |
| 2005/0254481 | A1 | 11/2005 | Vishik et al. |
| 2006/0064492 | A1 * | 3/2006 | Hirsch ............... H04L 65/1069 709/227 |
| 2007/0094490 | A1 | 4/2007 | Lohr |
| 2007/0133455 | A1 | 6/2007 | Kuchibhotla et al. |
| 2008/0032703 | A1 | 2/2008 | Krumm et al. |
| 2008/0037752 | A1 | 2/2008 | Chatilov et al. |
| 2009/0119590 | A1 | 5/2009 | Kondziela et al. |
| 2009/0128335 | A1 | 5/2009 | Leung et al. |
| 2009/0150562 | A1 | 6/2009 | Kim et al. |
| 2009/0164645 | A1 | 6/2009 | Sylvain |
| 2009/0215477 | A1 | 8/2009 | Lee et al. |
| 2010/0159871 | A1 | 6/2010 | Tester |
| 2010/0304724 | A1 | 12/2010 | Lawler et al. |
| 2012/0317162 | A1 | 12/2012 | Endsley et al. |
| 2013/0013698 | A1 | 1/2013 | Relyea et al. |
| 2013/0023167 | A1 | 1/2013 | Ozawa |
| 2013/0024431 | A1 | 1/2013 | Parthasarathy et al. |
| 2013/0091298 | A1 | 4/2013 | Ozzie et al. |
| 2013/0184027 | A1 | 7/2013 | Becker et al. |
| 2013/0304694 | A1 | 11/2013 | Barreto et al. |
| 2014/0149512 | A1 | 5/2014 | Leitch |
| 2014/0280562 | A1 | 9/2014 | Shields |
| 2014/0282102 | A1 | 9/2014 | Avrahami |
| 2014/0310348 | A1 | 10/2014 | Keskitalo et al. |
| 2015/0009818 | A1 | 1/2015 | Xiao et al. |
| 2015/0095420 | A1 | 4/2015 | Haun et al. |
| 2015/0111553 | A1 | 4/2015 | Efrati et al. |
| 2015/0163295 | A1 | 6/2015 | Shmilov et al. |
| 2015/0208217 | A1 | 7/2015 | Hong et al. |
| 2015/0215233 | A1 | 7/2015 | Lee |
| 2015/0244807 | A1 | 8/2015 | Shoemake et al. |
| 2015/0341288 | A1 | 11/2015 | Dandison et al. |
| 2015/0350124 | A1 | 12/2015 | Lee et al. |
| 2016/0036881 | A1 | 2/2016 | Tembey et al. |
| 2016/0044279 | A1 | 2/2016 | Block et al. |
| 2016/0050263 | A1 | 2/2016 | Hwang et al. |
| 2016/0122012 | A1 | 5/2016 | Choo et al. |
| 2016/0149966 | A1 | 5/2016 | Remash et al. |
| 2016/0150063 | A1 | 5/2016 | Choi et al. |
| 2016/0150537 | A1 | 5/2016 | Jung et al. |
| 2016/0162252 | A1 | 6/2016 | Di Censo et al. |
| 2016/0164810 | A1 | 6/2016 | Wolz et al. |
| 2016/0308980 | A1 * | 10/2016 | Singh ............... H04M 1/72583 |
| 2016/0327950 | A1 | 11/2016 | Bachrach et al. |
| 2016/0360503 | A1 | 12/2016 | Rauenbuehler et al. |
| 2017/0154339 | A1 | 6/2017 | Kimberlin |
| 2017/0264652 | A1 | 9/2017 | Karimli et al. |
| 2017/0264742 | A1 | 9/2017 | Karimli et al. |
| 2017/0289000 | A1 | 10/2017 | Park et al. |
| 2017/0359799 | A1 | 12/2017 | Karimli et al. |
| 2018/0060824 | A1 | 3/2018 | Shaaban et al. |
| 2018/0190273 | A1 * | 7/2018 | Karimli ............... G10L 15/063 |
| 2018/0234550 | A1 | 8/2018 | Lifson et al. |
| 2019/0281579 | A1 | 9/2019 | Karimli et al. |
| 2020/0220972 | A1 | 7/2020 | Karimli et al. |

FOREIGN PATENT DOCUMENTS

| | | |
|---|---|---|
| CN | 101584167 B | 11/2011 |
| CN | 104012040 A | 8/2014 |
| CN | 104866264 A | 8/2015 |
| CN | 105847913 A | 8/2016 |
| CN | 106878651 A | 6/2017 |
| EP | 2590376 A1 | 5/2013 |
| GB | 2426147 A | 11/2006 |
| KR | 20090022137 A | 3/2009 |
| KR | 20110080375 A | 7/2011 |
| KR | 101475006 B1 | 12/2014 |
| KR | 20170055168 A | 5/2017 |
| WO | 2009108841 A2 | 9/2009 |
| WO | 2013109034 A1 | 7/2013 |

OTHER PUBLICATIONS

European Patent Office, Extended European Search Report, EP Patent Application 17810764.5, dated Dec. 4, 2019, 8 pages.
European Patent Office, Extended European Search Report, EP Patent Application 17831546.1, dated Jan. 3, 2020, 8 pages.
International Search Report and Written Opinion, PCT Application No. PCT/US2017/019714, dated Jun. 9, 2017, 12 pages.
International Search Report and Written Opinion, PCT Application No. PCT/US2017/035768, dated Sep. 12, 2017, 7 pages.
International Search Report and Written Opinion, PCT Application No. PCT/US2017/040464, dated Oct. 24, 2017, 12 pages.
International Searching Authority, International Search Report and Written Opinion, PCT Patent Application PCT/US2018/039149, dated Dec. 3, 2018, 12 pages.
U.S. Appl. No. 15/212,760, "Cross-platform Video Conversation Between Related Devices," filed Jul. 18, 2016, 60 pages.
United States Patent and Trademark Office, Examiner's Answer to Appeal Brief, U.S. Appl. No. 15/063,749, dated Mar. 12, 2019, 11 pages.
United States Patent and Trademark Office, Final Office Action, U.S. Appl. No. 15/063,749, dated Jul. 11, 2017, 18 pages.
United States Patent and Trademark Office, Final Office Action, U.S. Appl. No. 15/063,749, dated Jul. 11, 2018, 19 pages.
United States Patent and Trademark Office, Final Office Action, U.S. Appl. No. 15/063,749, dated Oct. 2, 2019, 24 pages.
United States Patent and Trademark Office, Final Office Action, U.S. Appl. No. 15/212,760, dated Apr. 12, 2019, 16 pages.
United States Patent and Trademark Office, Final Office Action, U.S. Appl. No. 15/212,760, dated Jul. 8, 2020, 12 pages.
United States Patent and Trademark Office, Final Office Action, U.S. Appl. No. 15/247,470, dated Mar. 22, 2018, 16 pages.
United States Patent and Trademark Office, Final Office Action, U.S. Appl. No. 16/422,757, dated Feb. 19, 2020, 12 pages.
United States Patent and Trademark Office, Non-Final Office Action, U.S. Appl. No. 15/063,749, dated Aug. 29, 2016, 18 pages.
United States Patent and Trademark Office, Non-Final Office Action, U.S. Appl. No. 15/063,749, dated Dec. 11, 2017, 19 pages.
United States Patent and Trademark Office, Non-Final Office Action, U.S. Appl. No. 15/063,749, dated Feb. 8, 2017, 17 pages.
United States Patent and Trademark Office, Non-Final Office Action, U.S. Appl. No. 15/063,749, dated Jun. 21, 2019, 24 pages.
United States Patent and Trademark Office, Non-Final Office Action, U.S. Appl. No. 15/212,760, dated Dec. 15, 2017, 23 pages.
United States Patent and Trademark Office, Non-Final Office Action, U.S. Appl. No. 15/212,760, dated Jul. 31, 2018, 20 pages.
United States Patent and Trademark Office, Non-Final Office Action, U.S. Appl. No. 15/212,760, dated Oct. 16, 2019, 19 pages.
United States Patent and Trademark Office, Non-Final Office Action, U.S. Appl. No. 15/247,470, dated Aug. 25, 2017, 13 pages.
United States Patent and Trademark Office, Non-Final Office Action, U.S. Appl. No. 15/247,470, dated Sep. 27, 2018, 15 pages.
United States Patent and Trademark Office, Non-Final Office Action, U.S. Appl. No. 16/422,757, dated Aug. 22, 2019, 8 pages.
United States Patent and Trademark Office, Non-Final Office Action, U.S. Appl. No. 16/422,757, dated Jun. 24, 2020, 12 pages.

(56) References Cited

OTHER PUBLICATIONS

United States Patent and Trademark Office, Notice of Allowance, U.S. Appl. No. 15/063,749, dated Dec. 23, 2019, 9 pages.
United States Patent and Trademark Office, Notice of Allowance, U.S. Appl. No. 15/247,470, dated Mar. 13, 2019, 7 pages.

* cited by examiner

VIDEO CALL CONTINUITY BETWEEN DEVICES VIA A TELECOMMUNICATIONS NETWORK

CROSS REFERENCE TO RELATED APPLICATIONS

This application is a continuation of U.S. patent application Ser. No. 15/632,167, filed on Jun. 23, 2017, entitled VIDEO CALL CONTINUITY BETWEEN DEVICES VIA A TELECOMMUNICATIONS NETWORK, which is related to U.S. patent application Ser. No. 15/212,760, filed on Jul. 18, 2016, entitled CROSS-PLATFORM VIDEO CONVERSATION BETWEEN RELATED DEVICES, which are hereby incorporated by reference in their entireties.

BACKGROUND

Many users have multiple telecommunication devices or mobile devices, such as cellular phones, smart phones, tablet computers, laptops, and other devices. Each device may have its own communication address, such as a telephone number, and may receive communications directed to any communication address associated with a service account.

In (IP) Multimedia Subsystem (IMS), call forking may be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it may be sent to all network identities of that registration set.

Session Initiation Protocol (SIP), as extended by RFC 3265 ("Session Initiation Protocol (SIP)-Specific Event Notification", June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for inter-operability within an IP Multimedia Subsystem (IMS). One feature of RCS is the ability to discover capabilities of contacts. RCS utilizes OMA Presence SIMPLE for various features, including subscription to a presence server to obtain capability information for a list of contacts.

In some examples, users may communicate with other users via conversational video services including, but not limited to, videotelephony, videoconferencing, etc. Videotelephony enables communication via live, simultaneous two-way video and audio transmissions between two devices. Videoconferencing enables two or more locations to communicate via live, simultaneous two-way video and audio transmissions via a multipoint control unit. Various computing platforms enable conversational video services.

In at least one example, IR.94 is a GSMA program that defines an IMS profile for conversational video services to enable voice/video calling services over Long-Term Evolution (LTE) cellular networks. IR.94 is the definition of an IMS profile by listing a number of Evolved Universal Terrestrial Radio Access Network (E-UTRAN), Evolved Packet Core, IMS core, and user equipment (UE) features, which are considered essential to launch interoperable IMS based conversational video services.

In additional and/or alternative examples, web-based applications including, but not limited to, FACETIME®, SKYPE®, GOOGLE+ HANGOUTS®, etc. may provide conversational video services. FACETIME® is an application that facilitates one-on-one video conversation via Voice over IP (VOIP). SKYPE® is an application that provides video conversation and voice call services. SKYPE® allows users to communicate over the Internet by voice, video, etc. GOOGLE+ HANGOUTS® is an application that enables two or more users to communicate via instant messaging, video conversation, Short Message Service (SMS), and VOIP features.

BRIEF DESCRIPTION OF THE DRAWINGS

Embodiments of the present technology will be described and explained through the use of the accompanying drawings.

Figure 1:
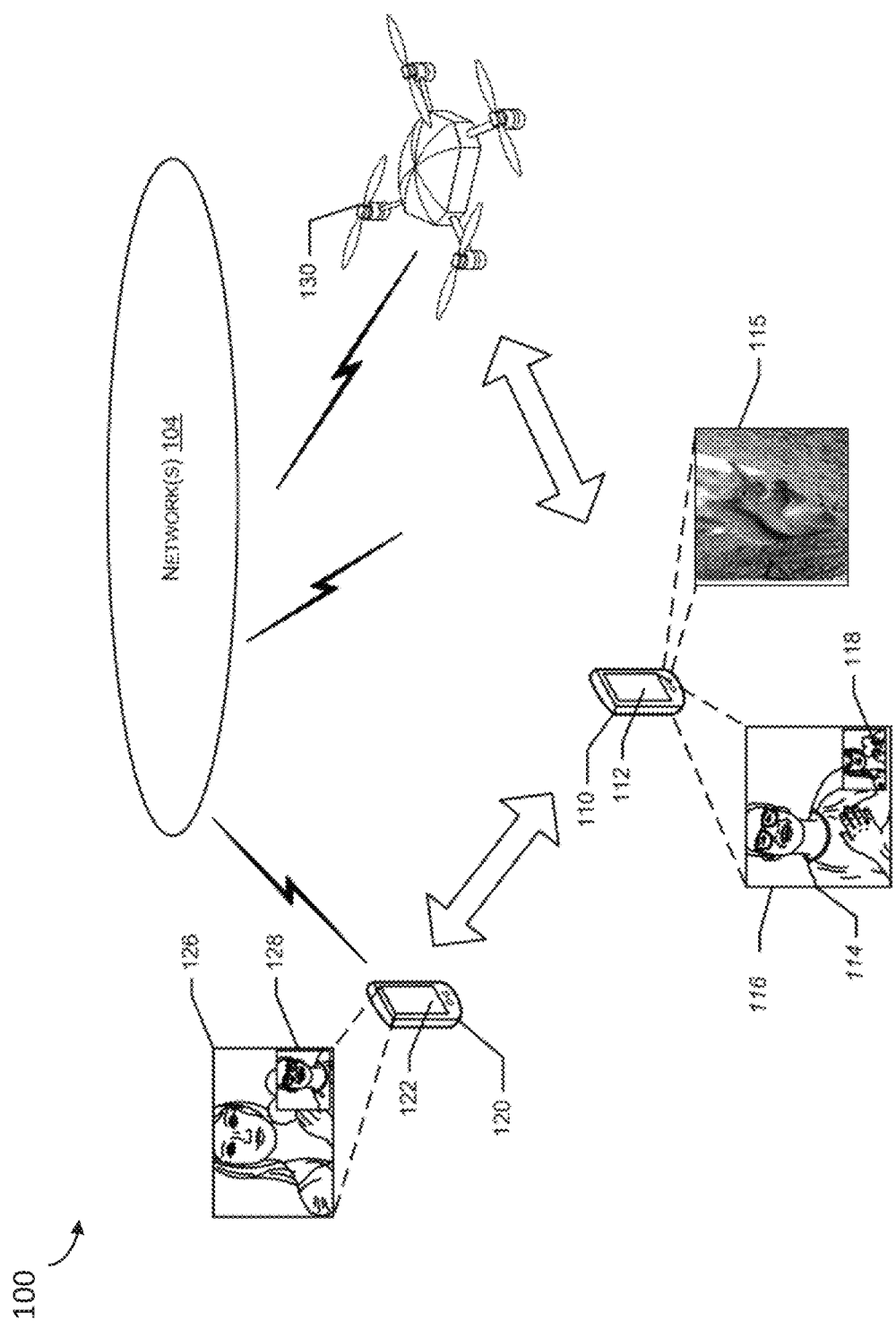
FIG. 1 is a block diagram illustrating an example transfer of video communications between devices.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for maintaining and/or facilitating video call continuity between devices. For example, the systems and methods support video calls or other communications between multiple devices (e.g., a mobile device providing a video call stream of content and a drone or other moving device capturing and streaming content via a camera) providing video content to a target device, such as another mobile device.

In some embodiments, the systems and methods facilitate a video call between a first mobile device and multiple, related devices, by providing information to the first mobile device, via a presence server of the network, that identifies the multiple, related devices and information indicating which of the multiple, related devices are currently available on a telecommunications network that includes the first mobile device, and facilitates the transfer of access to the video call between a first related device currently available on the telecommunications network and a second related device, such as a drone or other moving device, currently available on the telecommunications network of the multiple, related devices.

Thus, in some embodiments, the systems and methods facilitate the switching of call endpoint devices within a single established video call, to enable the provision of video content of either device (e.g., a mobile device and a drone) within the single call, without interruption and/or via a continuous call. The systems and methods, therefore, provide a continuity of provided content from multiple devices over a single video call, among other benefits.

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Telecommunications Networks

As described herein, in some embodiments, the systems and methods maintain, facilitate, support, and/or enable video call continuity, such as a seamless or continuous transfer of a video call, between devices within a telecommunications network.

FIG. 1 is a block diagram illustrating an example transfer of video communications 100 between devices. A mobile device 110 is associated with a first user, who is a subscriber of a telecommunications network 104. The mobile device 110 performs video-based communications (e.g., video calls, video chats, streaming of video or other visual or image-based content between devices, and so on) with other devices, such as another mobile device 120 (associated with a second user) and/or a drone 130 or other moving capture device (e.g., unmanned aerial vehicle) configured to capture and provide video content to recipient devices. The drone 130, in some cases, is paired with and/or related to the other mobile device 120 (e.g., is associated with the second user, who is also a subscriber of the network 104).

In some cases, a group of related devices (e.g., paired devices) includes devices that are associated with the same subscriber account, share the same cellular telephone line, and so on. Devices sharing the same subscriber account are often associated with an international mobile subscriber identity (IMSI). Devices sharing the same telephone line may be configured to send, receive, and initiate, cellular communications using a shared identifier, communications address, and so on, such as a telephone number, MSISDN (e.g., sometimes referred to as the "Mobile Station International Subscriber Directory Number"), IP Multimedia Public Identifiers (IMPU), and so forth.

Thus, devices may be related or paired based on their being associated with the same "account" (e.g., associated with an IMSI), associated with the same "line" (e.g., associated with the same communication address), and so on. In some cases, therefore, devices that are associated with a same account and/or a same line are called "related devices" or "paired devices." In some embodiments, related devices include devices for which incoming calls and messages (such as Short Message Service (SMS) messages) sent to the common communication address may be sent to all of the related devices.

In some embodiments, the mobile device 110 and the related devices (e.g., devices 120 and 130, or another combination of device, virtual reality or augmented reality googles, and/or drone or other associated moving capture device, such as a vehicle, peripheral, wearable device, and so on) are each communicatively coupled to the network 104 (which may be one or more networks).

As described herein, the network(s) 104 may include a cellular network, the Internet, and/or another network. In some embodiments, presence information for the various devices may be obtained from and/or stored by a presence server associated with the network 104, such as a SIP server or other server. One or more of the devices may utilize presence information (such as Internet Protocol (IP) addresses or other network address information) to establish a connection between the related devices, in order to transfer aspects of video conversations, such as which device is providing content within a conversation) between the devices.

In some cases, the devices (e.g., mobile device 110) may utilize presence information obtained from the presence server to identify one or more devices currently online and/or connected to the network 104 and available to provide content and/or other participate in video conversations with other devices. For example, the presence information may identify that the mobile device 120 and the drone 130 are both online and actively providing video content for possible consumption and/or presentation by the mobile device 110 during a video call between the devices.

In some embodiments, various aspects of the network 104 (to be discussed herein) may utilize the presence server to establish communications sessions between the devices, and/or may enforce or apply a sharing or transfer policy for sharing or transferring video conversations, such as a sharing policy that allows a video conversation to be shared between devices. Further details regarding the components and/or operation of the presence server are discussed herein.

Thus, as described herein, the systems and methods may facilitate video call continuity for a video call occurring between the mobile device 110 and the related, or paired, devices 120, 130.

In an example video call scenario, the mobile device 110 is participating in a video conversation with the other mobile device 120. For example, the device 110 and the device 120 are participating in live, simultaneous two-way video and audio transmissions. During the video call, a display 112 of the device 110 presents a user interface 114, which presents a live video feed transmitted by the device 110 via a first region 118 of the user interface 114, as well as a live video feed transmitted by the device 120 via a second region 116 of the user interface 114. For example, the second region 116 of the user interface 114 may present live video of the second user associated with the mobile device 120 and/or video or other image-based content captured by the mobile device 120 (such as via a camera or other imaging component of the device 120).

The mobile device 120 (and other similar devices, not shown) may present similar, but inversed, video content to the second user. For example, a display 122 of the device 120 presents a user interface 124, which presents a live video feed transmitted by the device 120 via a first region 128 of the user interface 124, as well as a live video feed transmitted by the device 110 via a second region 126 of the user interface 124. Thus, the two devices, as shown, facilitate, via the displayed video feeds, a two-way video call between the first user (associated with the mobile device 110) and the second user (associated with the mobile device 120).

In some embodiments, one or both of the users may wish to introduce video content captured or provided (e.g., streamed) by a related device capable of capturing and providing video content, such as the drone 130, which is related to the mobile device 120. Utilizing the systems and methods described herein, one or both of the users may provide input that indicates a request to transfer one endpoint of the video call from the second device 120 to the drone 130, which, upon completion of the transfer, captures video content (e.g., a video of a squirrel in a tree proximate to the drone 130) to be provided to the video call.

The mobile device 110, now in a video call with the drone 130, receives the content from the drone 130 without an interruption of the video call, and displays, via example user interface 115, the video content captured by the drone 130. As described herein, the systems and methods enable the mobile device 110 to engage in a video conversation with both of the related devices (device 120 and drone 130) associated with the second user, by switching or otherwise transferring control or access to the video call by the devices.

Figure 2:
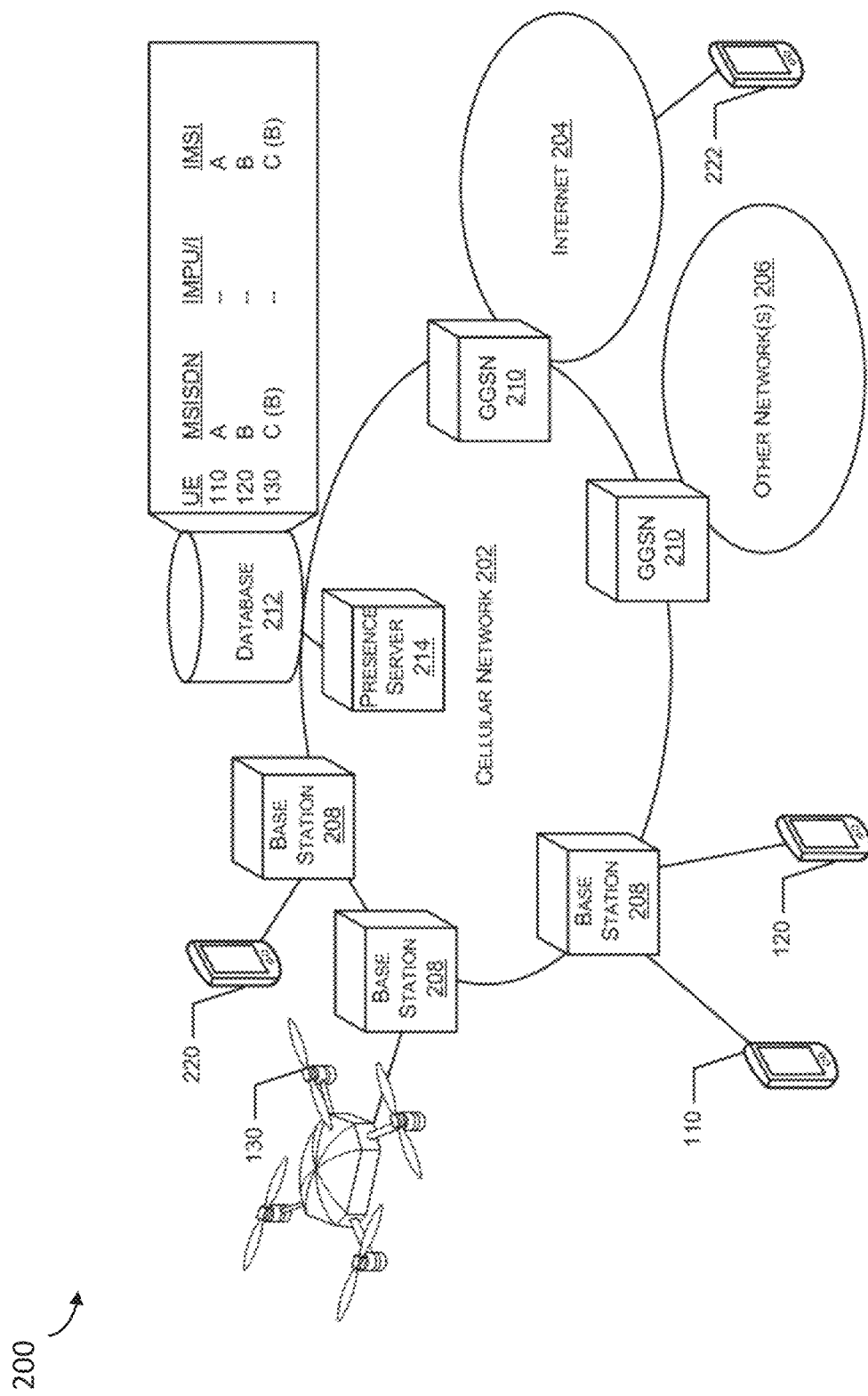
FIG. 2 is a block diagram illustrating a suitable computing environment for supporting video call continuity between devices.

FIG. 2 is a block diagram illustrating a suitable computing environment 200 for supporting video call continuity between devices. In some embodiments, the mobile device 110 communicates with the other devices (device 120, drone 130, another mobile device 220, or other devices, nor shown) via cellular network 202, the Internet 204, and/or one or more other networks 206. The cellular network 202, the Internet 204, and/or the one or more other networks 206 may correspond to the telecommunications network 104 depicted in FIG. 1.

In some cases, the devices may connect to the cellular network 202 via an associated base station 208. The cellular network 202 may be responsible for routing voice communications to other networks 206, as well as routing data communications to external packet switched networks, such as the Internet 204. For example, the cellular network 202 may include a Gateway GPRS Support Node (GGSN) 210, or another equivalent node.

In some cases, the devices may be user equipment (UE). The UE may include a smart phone, a personal digital assistant, a netbook, a laptop computer, a smart appliance, a video camera, a moving capture device (e.g., drone 130), and/or another electronic device that is capable of sending and/or receiving voice, video, and/or data via the cellular network 202, the Internet 204, and/or one or more other network(s) 206 (e.g., a Wi-Fi network, another access network, and so on).

In an example where a UE is a mobile device, the mobile device may include a subscriber identity module (SIM) card, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that may be used to place a call to the GSM phone. The MSISDN is not necessarily stored on the SIM card or the phone, and the MSISDN is not permanently associated with the IMSI. The MSISDN may change if the subscription changes, for example. In some cases, other devices, such as the drone 130, may include a SIM card.

In some embodiments, multiple UEs, such as paired or relate devices) are registered with a common number (e.g., MSISDN, IMPU, IMPI, and so on), line, and/or are associated with a common subscriber account (e.g., IMSI). For example, related devices may each have their own unique IMSI programmed into their respective SIM cards, and which are associated with a specific telephone number (MSISDN), which may also be unique to each related device. However, the IMSI and MSISDN pair may be associated in the network with "alias numbers" to allow for shared lines and/or shared accounts, thereby making them related devices.

In some embodiments, various line and/or account associations for related devices may be stored in a database 212, such as a database associated with a presence server 214. For example, the mobile device 110 is associated with IMSI A and MSISDN A. The mobile device 120 is associated with IMSI B and MSISDN B. The drone 130 is associated with IMSI C and MSISDN C, but also with MSISDN B and alias IMSI B. Thus, the drone 130 is associated with the same account and with the same line as the mobile device 120.

In some cases, other devices, such as other related devices (e.g., mobile device 222), which may not capable of connecting through a base station 208 of the cellular network 202, may also register with the cellular network 202 through the Internet 204 using a unique identifier, such as an IMPI or IMPU, a globally routable user agent URI (GRUU), or other identifier. For example, these identifiers may take the form of a telephone number (e.g., they may resemble a MSISDN). The cellular network 202 forwards calls and messages to the device 222, and the device 222 may send or receive shared video conversations in a same or similar way as with related devices. The database 212 may store information (e.g., actual or alias) associated with such devices.

As described herein, one or more of the devices may access and/or utilize presence information to determine which contacts correspond to related devices. For example, the presence information may include information about telephone numbers with which the mobile devices are registered. The device, such as device 110, may utilize the presence information to establish connections with different related devices. For example, the device 110 may utilize the connection to transfer or move between devices during a video conversation, vis the established connections.

In some embodiments, the mobile device 110 may establish a connection with one or more other related devices, and receive content from other related devices via the connected device. However, the device 110 may also establish peer-to-peer connections directly between different related devices. The connections may be established via the presence server 214, such as using the SIP protocol, which enables the establishment of connections between the different devices.

For example, the presence server 214 may retrieve data that corresponds to the IMSI, IMPU/IMPI of the various devices from the database 212. The data may include information specifying the associated device number (e.g., a MSISDN, IMPI, IMPU, or the like) for which the devices are able to utilize for initiating, sending, and/or receiving communications. Thus, the presence information may indicate the shared line or account (e.g., may indicate whether and how the devices are related devices), may enable a device to recognize that devices are related devices that share the same account and/or line, and/or may to distinguish devices that are not related devices. For example, the device 110 may request from the presence server 214 a list of devices related to a certain device or devices.

In some cases, the presence server 214 may be a SIP server, and a device may be configured to utilize OMA Presence SIMPLE to obtain presence information regarding one or more contacts. In some cases, the devices may be configured to provide their presence information to the presence server 214. Further, the devices may be configured to provide capabilities or functionality information to the presence server 214. The capabilities information may indicate an ability to receive instant messages, receive shared content, receive shared video conversations, and so forth. In some cases, devices may obtain each other's presence information and/or capabilities information in other ways, such as through static configuration, peer-to-peer connections, and so on.

In various configurations, the logic to enable the transfer of a video conversation between devices may be within the devices and/or within the presence server 214, and the devices or the server 214 may enforce a transfer policy to enable certain video conversations to be transferred between devices.

In some embodiments, the devices (e.g., via a mobile application), and/or the presence server 214 may include a call continuity system configured to facilitate the transfer of a video call between related devices, such as devices communicating different, unique captured streams of content to a single device, such as the device 110. Further details regarding the call continuity system are described herein.

FIG. 1 and the discussion herein provide a brief, general description of a suitable computing environment in which the call continuity system and/or presence server 214 can be supported and implemented. Although not required, aspects of the system or server 214 (which may include the system) are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the devices may include network communication components that enable the devices to communicate with remote servers or other portable electronic devices by transmitting and receiving wireless signals using a licensed, semi-licensed, or unlicensed spectrum over communications network, such as network 104 In some cases, the telecommunication network 104 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Examples of Providing Video Call Continuity Between Devices Via a Network

Figure 3:
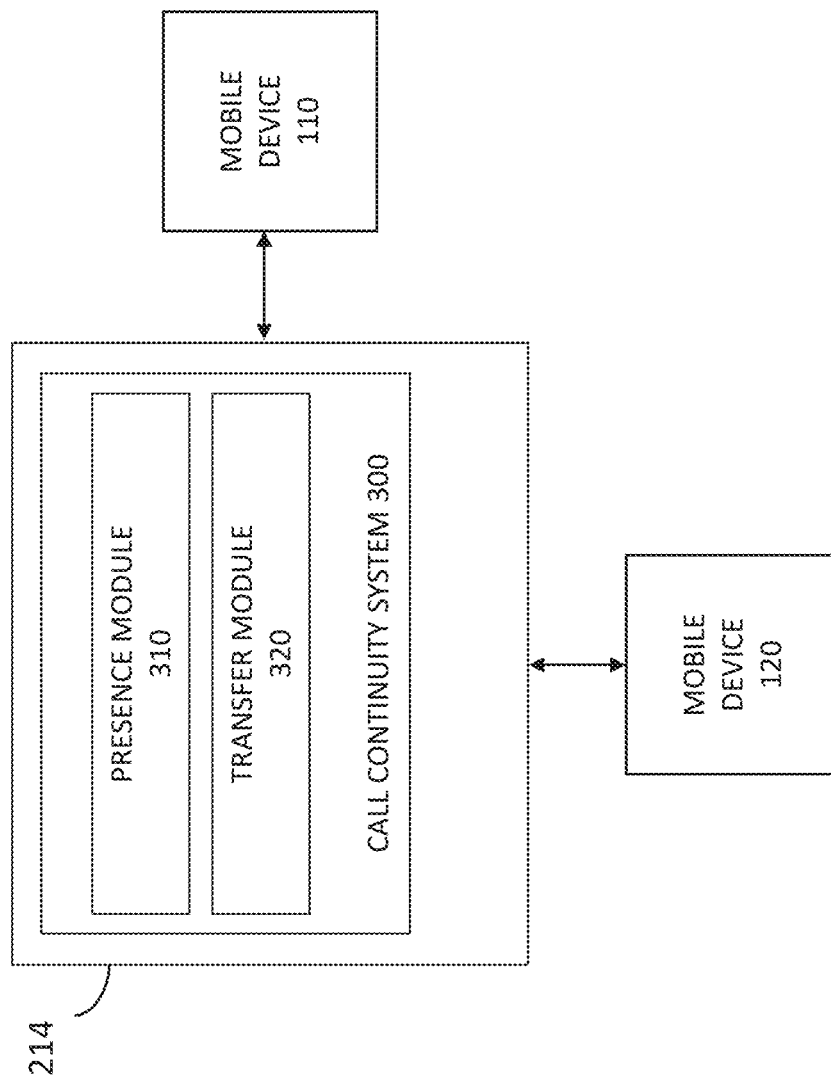
FIG. 3 is a block diagram illustrating components of a call continuity system

As described herein, in some embodiments, the presence server 214 may include and/or interact with a call continuity system or other system configured to facilitate seamless, continuous, and/or uninterrupted video calls between multiple devices, such as between a single device (e.g., device 110), and paired or related devices (e.g., device 120 and drone 130). FIG. 3 is a block diagram illustrating components of a call continuity system 300. As described herein, the presence server 214, one or more of the devices (e.g., device 110 or 120), and/or other components of the network 104 may include some or all aspects of the call continuity system 300.

The call continuity system 300 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the call continuity system 300 may include a presence module 310 and a transfer module 320.

In some embodiments, the presence module 310 is configured and/or programmed to provide information to a first mobile device (e.g., device 110) that identifies multiple, related devices (e.g., devices 120 and drone 1300, and information indicating which of the multiple, related devices are currently available on a telecommunications network that includes the first mobile device.

For example, the presence module 310 may provide presence server services to UEs, such as to the different devices 110, 120, and 130. The presence module 310 may be configured to register online presence information of various devices, and/or to provide presence information and/or capabilities information, as described herein, regarding the various devices. The module 310 may look up information regarding groups of related devices in the database 212, and provide presence information and/or capabilities information regarding those related devices to other ones of the related devices.

In some cases, the presence module 310 receives requests from devices for presence information, capabilities information, and/or preference information for contacts generally, including for related devices, and/or for lists of related devices. In response, the module 310 provides information indicating which, if any, devices are related devices associated with the requesting device. The presence module 310 may provide presence information and/or capabilities information using the OMA Presence SIMPLE protocol, or other similar protocols.

In some embodiments, the transfer module 320 is configured and/or programmed to transfer or allocate access to the video call between a first related device currently available on the telecommunications network and a second related device currently available on the telecommunications network of the multiple, related devices.

For example, the transfer module 320 may facilitate establishment of connections between devices, including establishment of connections between related devices and other devices, such as by following a transfer policy. The transfer policy may be based at least in part on presence information, capabilities information, and/or preference information, as described herein.

In some cases, the transfer policy may include rules for sharing content between devices, and may indicate that certain video conversations may be shared with related devices and that such video conversations may not to be shared with other devices that do not share a line or account with the device that received the live video and audio transmission. The transfer module 320, therefore, may authorize certain video conversations to be shared with certain related devices, but deny requests to establish a connection and/or transfer video conversations with other devices.

As described herein, one or more of the mobile devices may include similar modules or functionality. Although not shown in FIG. 3, the mobile devices 110, 120 may include a similar presence module, a video conversation module, and a user interface module.

In some embodiments, the device presence module may be configured and/or programmed to retrieve presence information for one or more devices, such as related devices, from the presence server 214 (e.g., via OMA Presence SIMPLE protocol).

In some embodiments, the video conversation module may be configured and/or programmed to facilitate video conversations between devices. For example, the video conversation module may be configured to simultaneously exchange live video and audio transmissions between devices via a computing platform such as IR.94 and/or various web-based applications including, but not limited to, FACETIME®, SKYPE®, GOOGLE+ HANGOUTS®, etc., as described herein.

In some embodiments, the user interface module may be configured to cause, via a user interface associated with the mobile device, a presentation of a list of one or more other devices that are permitted or capable of joining a video conversation with the device. The user interface may be interactive to receive user selection of at least one related device for sharing of the video conversation.

In some cases, the user interface module may call various Application Programming Interfaces (APIs) to initiate the live, simultaneous two-way video and audio transmissions between the devices participating in a video conversation, and/or call other APIs to retrieve the list of related devices, including their current online presence status (e.g., online or offline, busy, ready to stream content, and so on).

Thus, as described herein, the presence server 214, via the call continuity system 300, may perform various operations or processes to provide, facilitate, and/or manage call continuity during a video conversation when the source of content being provided to one of the endpoints of the conversations switches or is transferred between two or more related devices, such as between a mobile device and a paired drone.

Figure 4:
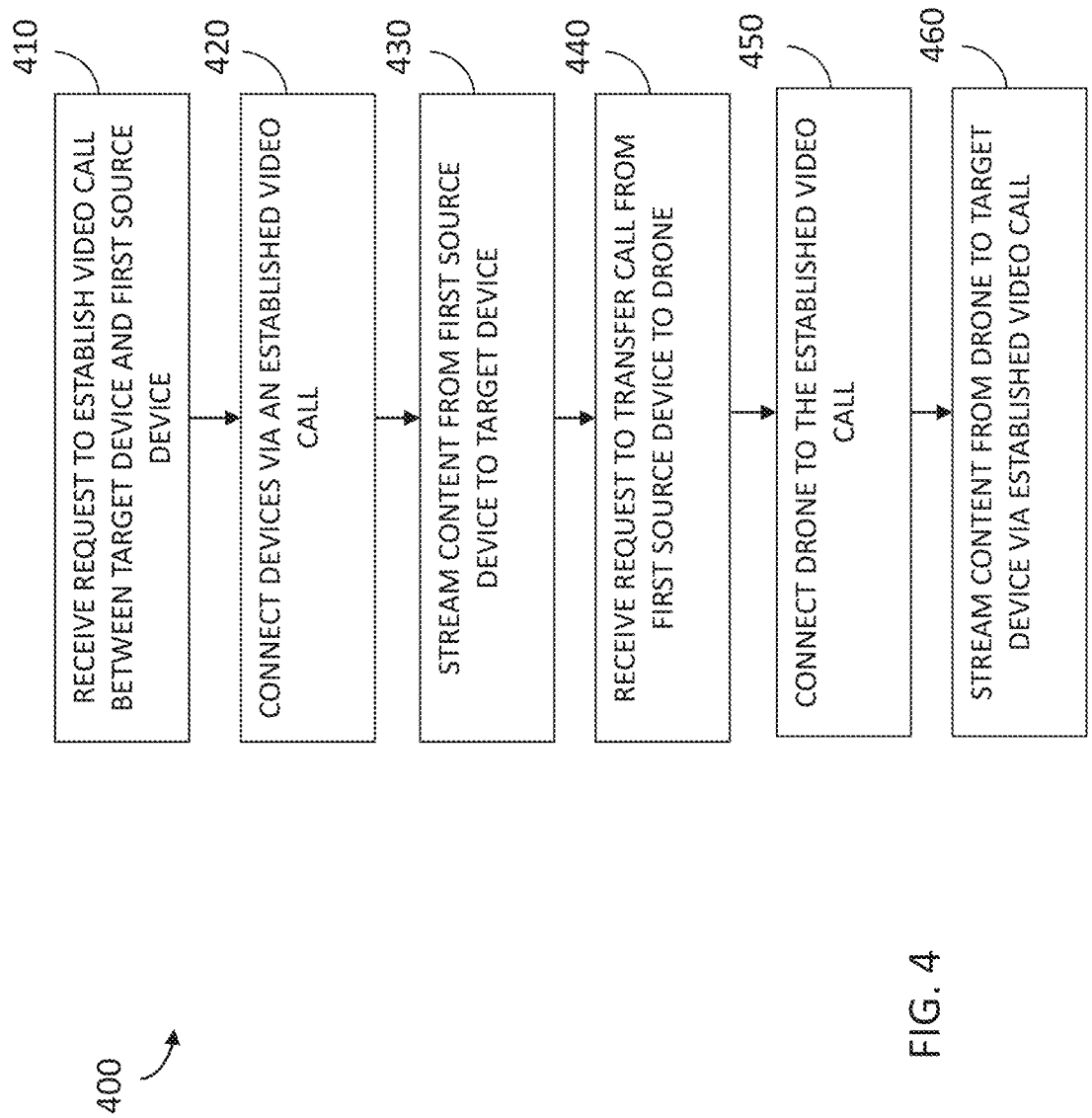
FIG. 4 is a flow diagram illustrating a method for maintaining a video call between a target device and multiple source devices.

FIG. 4 is a flow diagram illustrating a method 400 for maintaining a video call between a target device and multiple source devices. The method 400 may be performed by the call continuity system 300 and, accordingly, is described herein merely by way of reference thereto. It will be appreciated that the method 400 may be performed on any suitable hardware.

In operation 410, the system 300 receives, via input received from the first user via a first mobile device, a request to establish a video call between the first mobile device and a second mobile device. For example, the system 300 may receive information from the mobile device 110 that indicates a request to established a video call with the mobile device 120.

In operation 420, the system 300 connects, via a telecommunications network that includes a first user and second user as subscribers, the first mobile device to the second mobile device via the established video call. For example, the system 300 may facilitate a video call between the devices.

In operation 430, the system 300 facilitates streaming of video content via the established video call from the second mobile device to the first mobile device via the telecommunications network. For example, the mobile device 120 streams content to the device 110.

In operation 440, the system 300 receives, via additional input received from the first user via the first mobile device, a request to transfer the video call to the drone associated with the second user. For example, the system 300 receives a new request from the device 110 to access content streamed (or available to be streamed) from the drone 130 or other moving capture device, which is, in some cases, related to the mobile device 120. As described herein, the drone 130 may include one or more network communication components configured to send and receive information over the telecommunications network 104, as well as a video capture device (e.g., camera) configured to capture video of an area within which the drone is moving.

In operation 450, the system 300 connects, via the telecommunications network, the drone to the first mobile device via the established video call. For example, the presence module 310 may provide information to the first mobile device (e.g., device 110) that identifies multiple, related devices (e.g., devices 120 and drone 1300, and information indicating which of the multiple, related devices are currently available on a telecommunications network that includes the first mobile device.

In some cases, the system 300 establishes the connection between the drone and the first mobile device via the presence server 214 of the telecommunications network, which is configured to store information identifying the first mobile device, the second mobile device, and the drone, and configured to provide information to the first mobile device that identifies the second mobile device and the drone as related devices.

In operation 460, the system 300 facilitates streaming of video content via the established video call from the drone to the first mobile device via the telecommunications network. For example, the transfer module 320, via the presence server 214, may transfer or allocate access to the video call from the first related device currently available on the telecommunications network to the drone, which is also available on the telecommunications network.

Figure 5A:
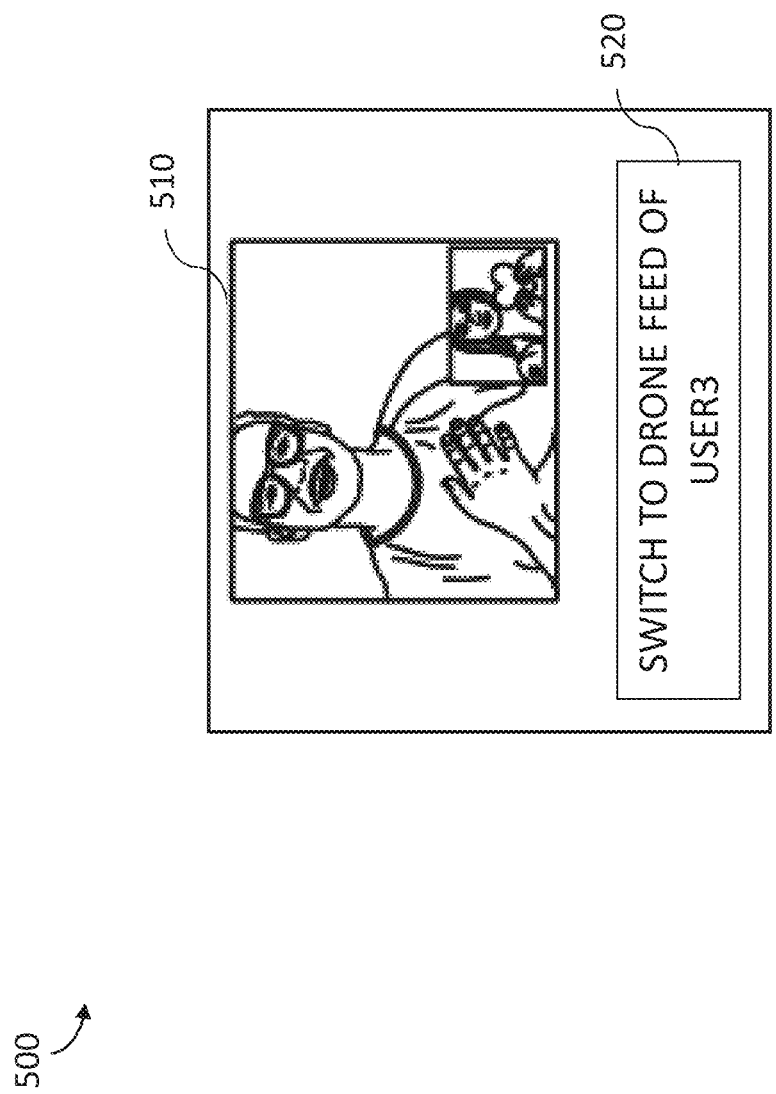
FIGS. 5A-5B are display diagrams illustrating example user interfaces for facilitating video communications between devices.
Figure 5B:
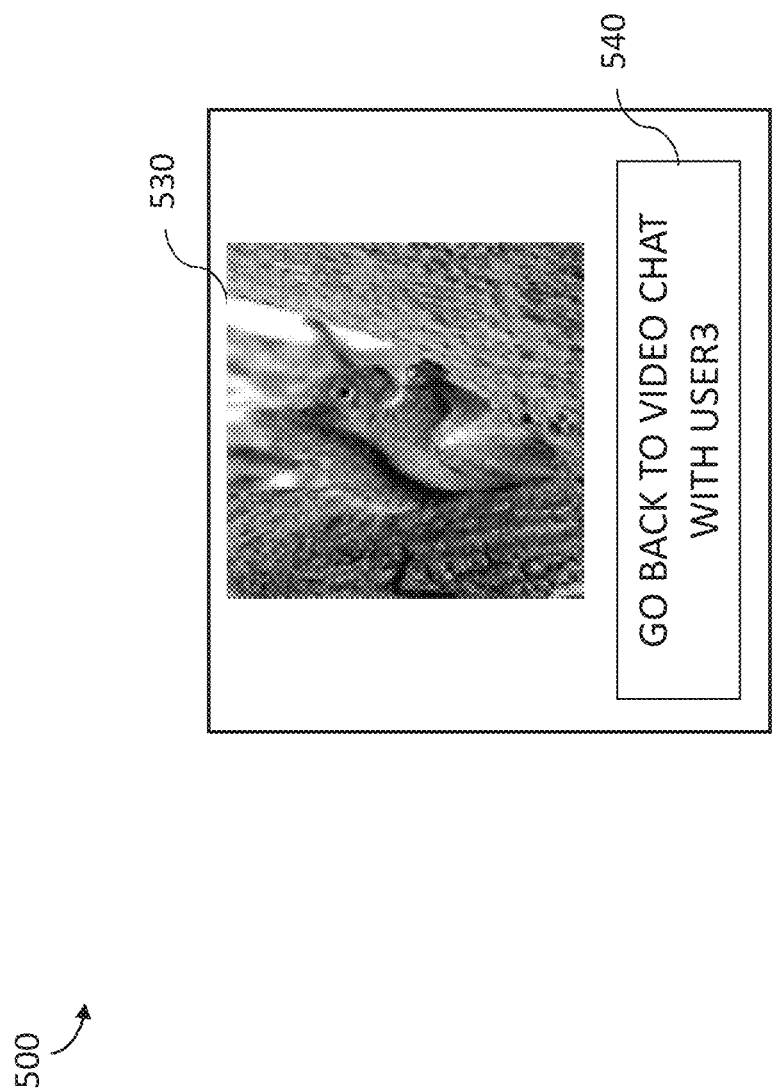

Thus, as described herein, the system 300 facilitates the switching of video streams provided by different, related devices during a single, established video call, without interruptions. FIGS. 5A-5B are display diagrams illustrating example user interfaces for facilitating video communications between devices.

As depicted in FIG. 5A, a user (e.g., a user associated with the mobile device 110) is engaged in a video conversation with a user associated with the mobile device 120. A user interface 500 of the user's mobile device presents video content 510 from the user of the device 120, along with a user-selectable element 520 that indicates video content from a drone related to the device 120 is available to be provided via the video call.

If the user selects the video content from the drone, the user interface 500, as depicted in FIG. 5B, receives video content from the drone (as described herein), and presents the drone provided content 530. The user may then select the element 540 to switch back to the video chat with the user of the device 120.

Of course, the device 120 may provide similar functionality, where the device 120 provides the user associated with the related devices with various user-selectable options to provide the different video feeds to the device 110.

Thus, as described herein, the systems and methods facilitate the switching of content provided within a single established video call, to enable the provision of video content from different, related devices (e.g., a mobile device and a drone) within the single call, without interruption and/or via a continuous call. The systems and methods, therefore, provide a continuity of provided content from multiple devices over a single video call, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. At least one computer-readable storage medium, excluding transitory signals, whose contents, when executed by a data processor, perform a method for facilitating a video call, the method comprising:
facilitating streaming of video content via an in-progress video call over a telecommunications network, between a first mobile device associated with a first user and a second mobile device associated with a second user;
receiving a request, at the first device, to provide a new stream of video content to the second device during the in-progress video call,
wherein the new stream of video content is provided by an image capture component, different from the first device, and
wherein the image capture component is associated with the first user or the first device;
communicatively connecting, via the telecommunications network, the image capture component to the second mobile device via the in-progress video call using a presence server provided by the telecommunications network,
wherein the presence server establishes the video call between the image capture component and the second mobile device by transferring video from the first mobile device in the video call to the new stream of video content from the image capture component,
wherein the presence server is configured to provide information to the second mobile device that identifies the first mobile device and the image capture component as related devices.

2. The computer-readable storage medium of claim 1, further comprising:
before receiving the request to transfer the video call to the image capture component associated with the second user:
receiving, from the presence server of the telecommunications network, information that identifies the image capture component is on the telecommunications network and related to the first mobile device; and
displaying, via a user interface, an indication that the image capture component is on the telecommunications network and configured to stream video content.

3. The computer-readable storage medium of claim 1, wherein the first mobile device and the image capture component share a common international mobile subscriber identity (IMSI) associated with a subscriber account for the first user to the telecommunications network.

4. The computer-readable storage medium of claim 1, wherein the first mobile device and the image capture component share a communication address or subscriber account number.

5. The computer-readable storage medium of claim 1, wherein facilitating streaming of video content via the in-progress video call via the telecommunications network includes facilitating the streaming of the video content directly from the image capture component to the second mobile device.

6. The computer-readable storage medium of claim 1, wherein facilitating streaming of video content via the in-progress video call via the telecommunications network includes facilitating the streaming of the video content from the image capture component to the second mobile device via the first mobile device.

7. The computer-readable storage medium of claim 1, wherein the second mobile device includes a user interface having a first display region configured to display video content received from the first mobile device and a second display region configured to display video content received from the image capture component.

8. The computer-readable storage medium of claim 1, wherein the second mobile device includes a user interface that displays video content received from the first mobile device or video content received from the image capture component.

9. A system for facilitating a video call between a first mobile device and a second mobile device, the system comprising:
at least one hardware computer; and
at least one hardware memory, coupled to the at least one hardware computer, and storing software modules, wherein the at least one computer is configured to execute the software modules, and wherein the software modules include:
a first module for receiving a request, at a first device, to provide a new stream of video content to a second device during an in-progress video call,
wherein the in-progress video call is over a telecommunications network between the first mobile device associated with a first user and the second mobile device associated with a second user,
wherein the new stream of video content is provided by an image capture component, different from the first device, and
wherein the image capture component is associated with the first user or the first device; and
a second module for communicatively connecting, via the telecommunications network, the image capture component to the second mobile device via the in-progress video call using a network server provided by the telecommunications network,
wherein the server establishes the video call between the image capture component and the second mobile device by transferring video from the first mobile device in the video call to the new stream of video content from the image capture component,
wherein the network server is configured to provide information to the second mobile device that identifies the first mobile device and the image capture component as related devices.

10. The system of claim 9, wherein the image capture component is a personal image capture component or an unmanned aerial vehicle.

11. The system of claim 9, further comprising:
before transferring the video call to the image capture component,
receiving, from the server of the telecommunications network, information that identifies the image capture component as being on the telecommunications network and related to the second mobile device; and
displaying, via a user interface, an indication that the image capture component is on the telecommunications network and configured to stream video content.

12. The system of claim 9, wherein the first mobile device and the image capture component share a common international mobile subscriber identity (IMSI) associated with a subscriber account for a user associated with the first device and the image capture device to the telecommunications network, and wherein the telecommunications network includes connectivity with multiple wireless local area networks (WLANs) or metropolitan area networks (WMANs).

13. The system of claim 9, wherein the first mobile device and the image capture component share a communication address or subscriber account number, and wherein the first mobile device and the second mobile device are registered with the same telecommunications network.

14. The system of claim 9, wherein streaming of video content via the in-progress video call from the image capture component via the telecommunications network includes facilitating the streaming of the video content directly from the image capture component to the second mobile device.

15. The system of claim 9, wherein streaming of video content via the in-progress video call from the image capture component via the telecommunications network includes facilitating the streaming of the video content from the image capture component to the second mobile device via the first mobile device.

16. The system of claim 9, wherein the second mobile device includes a user interface having a first display region configured to display video content received from the first mobile device and a second display region configured to display video content received from the image capture component.

17. The system of claim 9, wherein the second mobile device includes a user interface that replaces a display of video content received from the first mobile device with the video content received from the image capture component, and wherein the second mobile device includes virtual reality or augmented reality googles.

18. A system for facilitating a video call between a first mobile device and a second mobile device, the system comprising:
means for facilitating streaming of video content via an in-progress video call over a telecommunications network, between a first mobile device associated with a first user and a second mobile device associated with a second user;
means for receiving a request, at the first device, to provide a new stream of video content to the second device during the in-progress video call,
wherein the new stream of video content is provided by an image capture component, different from the first device, and
wherein the image capture component is associated with the first user or the first device;
means for communicatively connecting, via the telecommunications network, the image capture component to the second mobile device via the in-progress video call using a server provided by the telecommunications network,
wherein the server establishes the video call between the image capture component and the second mobile device by transferring video from the first mobile device in the video call to the new stream of video content from the image capture component,
wherein the server is configured to provide information to the second mobile device that identifies the first mobile device and the image capture component as related devices.

19. The system of claim 18, wherein the second mobile device includes a user interface having a first display region configured to display video content received from the first mobile device and a second display region configured to display video content received from the image capture component.

20. The system of claim 18, wherein the second mobile device includes a user interface that replaces a display of video content received from the first mobile device with the video content received from the image capture component, and wherein the second mobile device includes virtual reality or augmented reality googles.

* * * * *